(12) United States Patent
Fawcett et al.

(10) Patent No.: US 11,687,380 B2
(45) Date of Patent: Jun. 27, 2023

(54) OPTIMIZING RESOURCE ALLOCATION FOR DISTRIBUTED STREAM PROCESSING SYSTEMS

(71) Applicant: International Business Machines Corporation, Armonk, NY (US)

(72) Inventors: Bradley William Fawcett, Byron, MN (US); Paul Gerver, Rochester, MN (US); Jingdong Sun, Rochester, MN (US); Jason A. Nikolai, Rochester, MN (US); Henry Chiu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 17/016,508

(22) Filed: Sep. 10, 2020

(65) Prior Publication Data
US 2022/0075664 A1     Mar. 10, 2022

(51) Int. Cl.
| | | |
|---|---|---|
| G06F 9/50 | (2006.01) | |
| G06N 20/00 | (2019.01) | |
| G06F 9/48 | (2006.01) | |
| G06F 18/214 | (2023.01) | |

(52) U.S. Cl.
CPC .......... *G06F 9/5077* (2013.01); *G06F 9/4881* (2013.01); *G06F 9/50* (2013.01); *G06F 9/5061* (2013.01); *G06F 18/214* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 9,021,122 | B2 | 4/2015 | Branson |
| 9,189,449 | B2 | 11/2015 | Branson |
| 10,657,135 | B2 | 5/2020 | Cao |
| 10,671,916 | B1 | 6/2020 | Sundararaman |
| 2017/0063724 | A1 | 3/2017 | Cao |

(Continued)

FOREIGN PATENT DOCUMENTS

| | | |
|---|---|---|
| CN | 107908457 A | 4/2018 |
| CN | 110704182 A | 1/2020 |
| CN | 111258716 A | 6/2020 |

OTHER PUBLICATIONS

"Deployments", Kubernetes Project, retrieved from the Internet on Jul. 13, 2020, 2 pages, <https://kubernetes.io/docs/concepts/workloads/controllers/deployment/>.

(Continued)

*Primary Examiner* — Qing Yuan Wu
(74) *Attorney, Agent, or Firm* — Andre L. Adkins

(57) ABSTRACT

Computer software executing on computer hardware that performs the following operations: (i) training a machine learning model to determine allocations of computing resources to processing elements of a stream processing job according to a specified objective; and (ii) allocating a set of computing resources to the processing elements by: allocating to the processing elements a first subset of the set of computing resources based, at least in part, on a minimum resource requirement for the processing elements, and allocating to the processing elements a second subset of the set of computing resources based, at least in part, on an allocation determined using the trained machine learning model.

20 Claims, 10 Drawing Sheets

(56) References Cited

U.S. PATENT DOCUMENTS

2021/0357256 A1* 11/2021 Cao ..................... G06K 9/6256
2021/0406086 A1* 12/2021 Shivanna ............. G06F 9/5016

OTHER PUBLICATIONS

"Docker update", docker docs, 2 pages, retrieved from the Internet on Jul. 13, 2020, <https://docs.docker.com/engine/reference/commandline/update/>.

"IBM Cloud Pak for Data V2.5 delivers data and AI platform for hybrid multicloud on Red Hat OpenShift, featuring open source governance and AutoAI", IBM Japan Software Announcement JP19-0594, dated Oct. 15, 2019, 12 pages, Grace Period Disclosure document.

Mell et al., "The NIST Definition of Cloud Computing", Recommendations of the National Institute of Standards and Technology, Special Publication 800-145, Sep. 2011, 7 pages.

Mijumbi et al., "Learning Algorithms for Dynamic Resource Allocation in Virtualised Networks", retrieved from the Internet on Jul. 13, 2020, 4 pages, <<http://www.maps.upc.edu/rashid/files/EuCNCWorkshop.pdf>.

* cited by examiner

OPTIMIZING RESOURCE ALLOCATION FOR DISTRIBUTED STREAM PROCESSING SYSTEMS

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

(i) "IBM Cloud Pak for Data V2.5 delivers data and AI platform for hybrid multicloud on Red Hat OpenShift, featuring open source governance and AutoAI", IBM Japan Software Announcement JP19-0594, dated Oct. 15, 2019, 12 pages.

BACKGROUND

The present invention relates generally to stream processing systems, and more particularly to stream processing systems operating in distributed computing environments.

Stream processing (also rereferred to as "streaming processing" or "streams processing") is a known technique for performing queries on continuous streams of data, such as data from sensors, cameras, news feeds, and the like. In stream processing jobs, operators perform operations on data streams, where individual pieces of data within data streams are generally referred to as "tuples." Operators are generally contained within individual execution units, sometimes called "processing elements."

In distributed computing systems, a container is a stand-alone executable package of a piece of software that includes everything needed to run the piece of software, including application code, runtime, system tools, system libraries, and settings. A container can run in various computing environments including, but not limited to, a local computing device (e.g., a desktop or a laptop), physical or virtual machines in a data center, and cloud providers.

When implementing stream processing systems in distributed environments, individual portions of stream processing jobs, such as processing elements, can be distributed across multiple respective containers, and compute resources, such as central processing unit (CPU) cores and memory, can be allocated by container orchestration systems to those individual portions of the stream processing jobs on a portion-by-portion basis.

SUMMARY

According to an aspect of the present invention, there is a method, computer program product and/or system that performs the following operations (not necessarily in the following order): (i) training a machine learning model to determine allocations of computing resources to processing elements of a stream processing job according to a specified objective; and (ii) allocating a set of computing resources to the processing elements by: allocating to the processing elements a first subset of the set of computing resources based, at least in part, on a minimum resource requirement for the processing elements, and allocating to the processing elements a second subset of the set of computing resources based, at least in part, on an allocation determined using the trained machine learning model.

DETAILED DESCRIPTION

Figure 1:
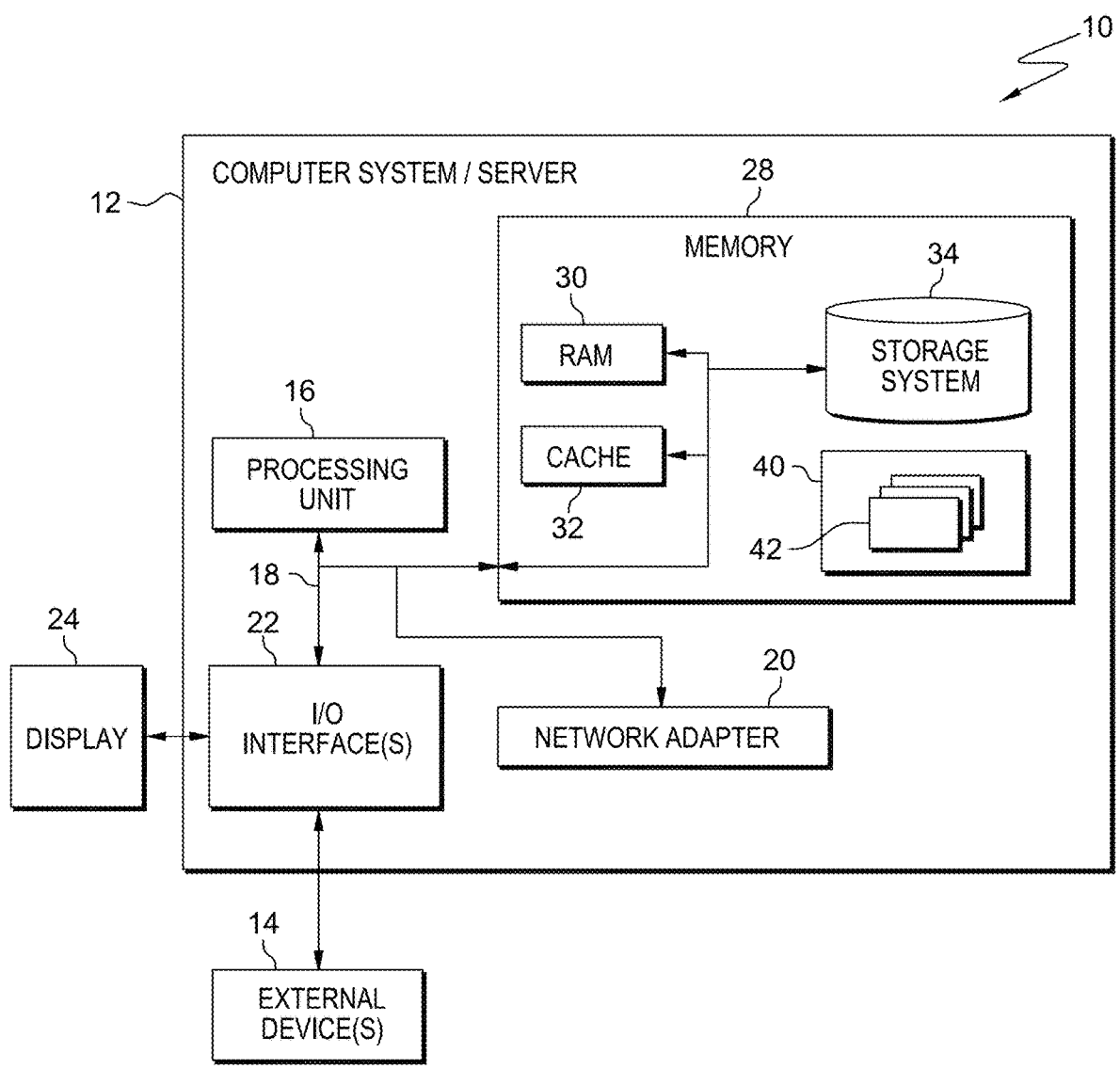
FIG. 1 depicts a cloud computing node used in a first embodiment of a system according to the present invention (also called the "first embodiment system")

When performing stream processing in distributed environments, such as container-based environments, resource requirements for an individual stream processing job and its respective processing elements are typically determined at setup time, based on fixed requirements, and remain static for the life of the job. This can result in non-optimal resource allocations across the respective processing elements of the job. Various embodiments of the present invention leverage machine learning to optimally allocate resources across the processing elements for a stream processing job, both at setup and throughout the life of the job, resulting in more efficient processing that produces results that are optimal with respect to a specified objective.

This Detailed Description section is divided into the following sub-sections: (i) The Hardware and Software Environment; (ii) Example Embodiment; (iii) Further Comments and/or Embodiments; and (iv) Definitions.

The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
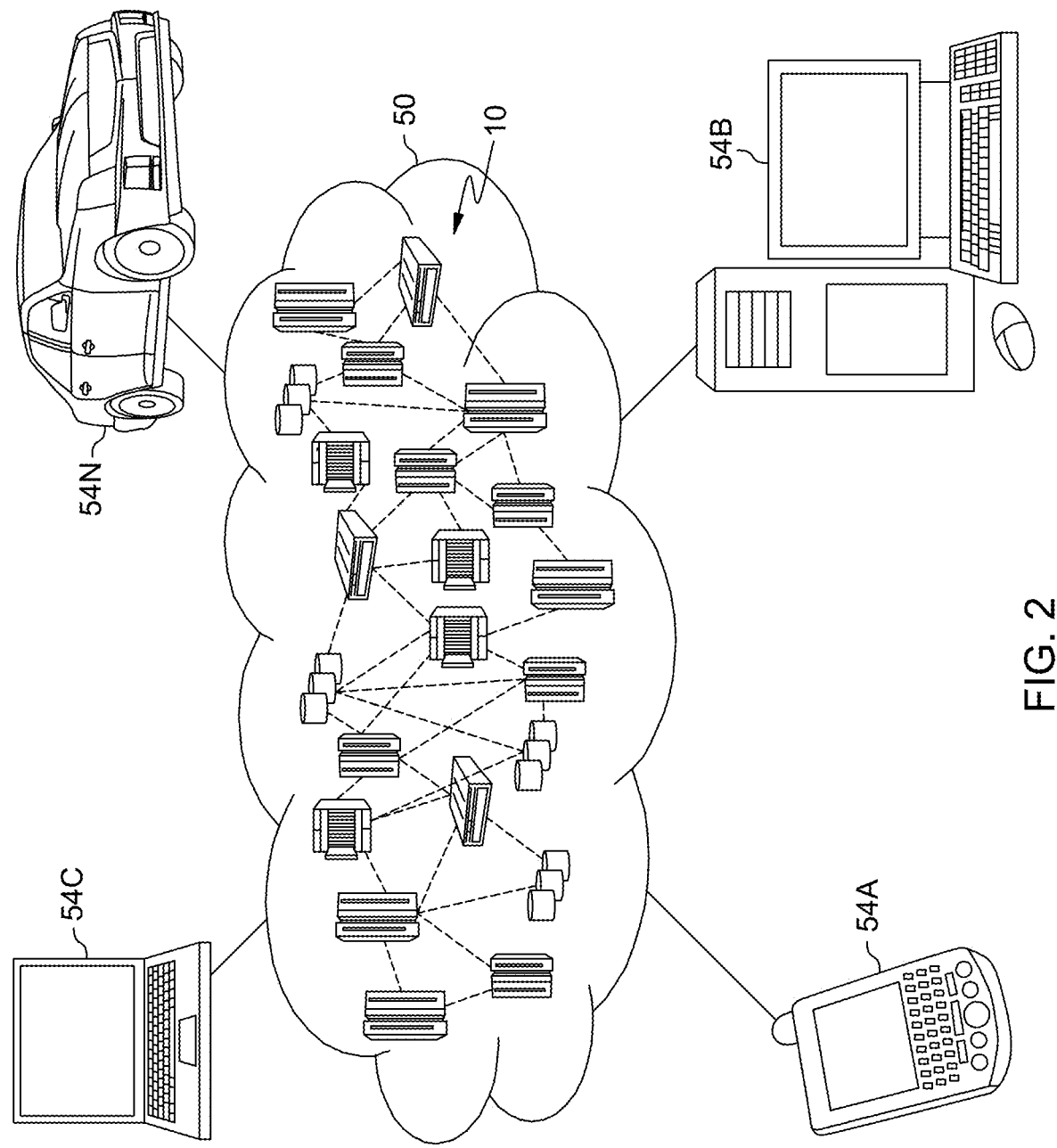
FIG. 2 depicts a cloud computing environment of the first embodiment system.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
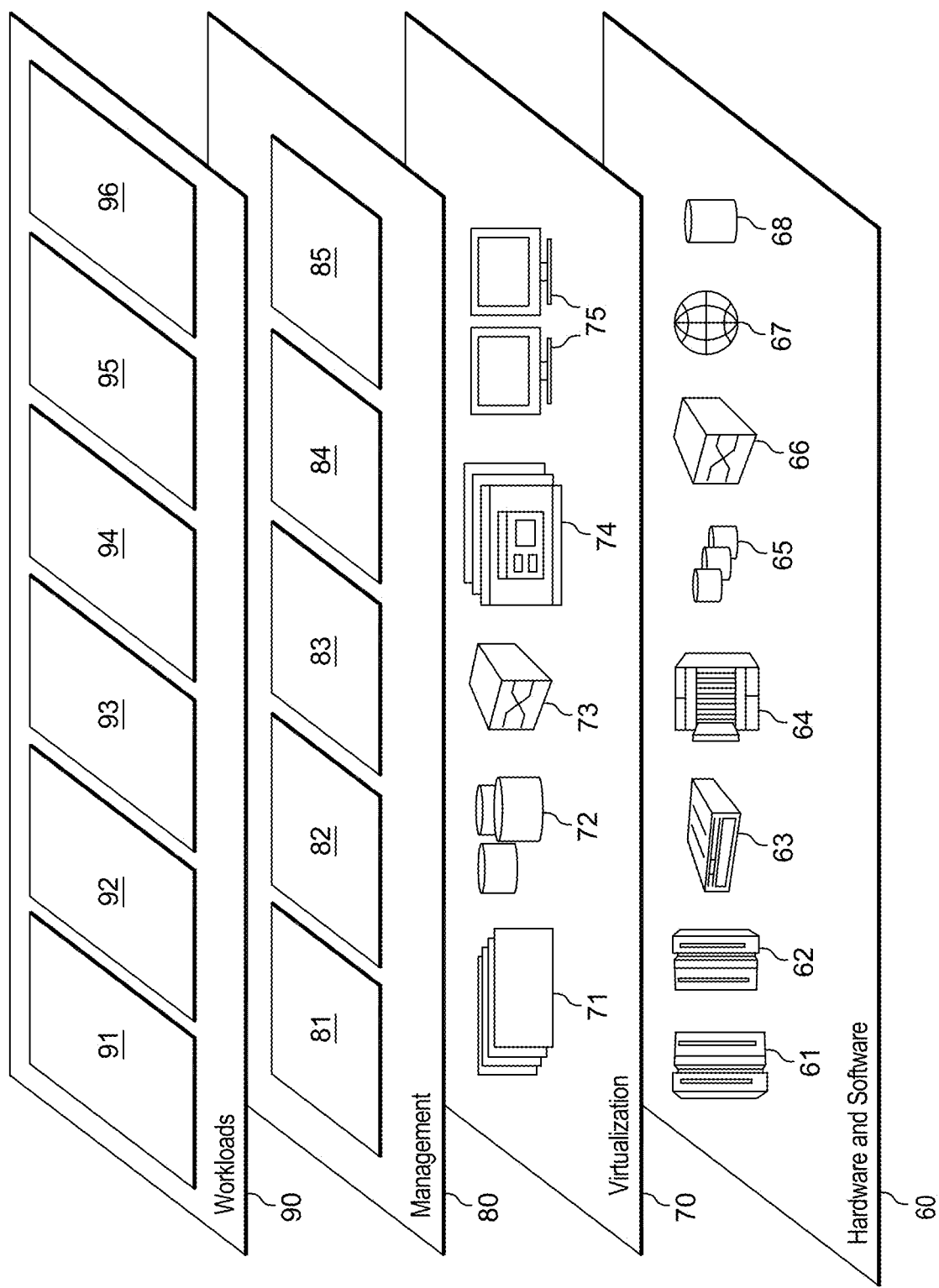
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource allocation 96, as will be discussed in detail, below, in the following subsections of this Detailed Description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLE EMBODIMENT

Figure 4:
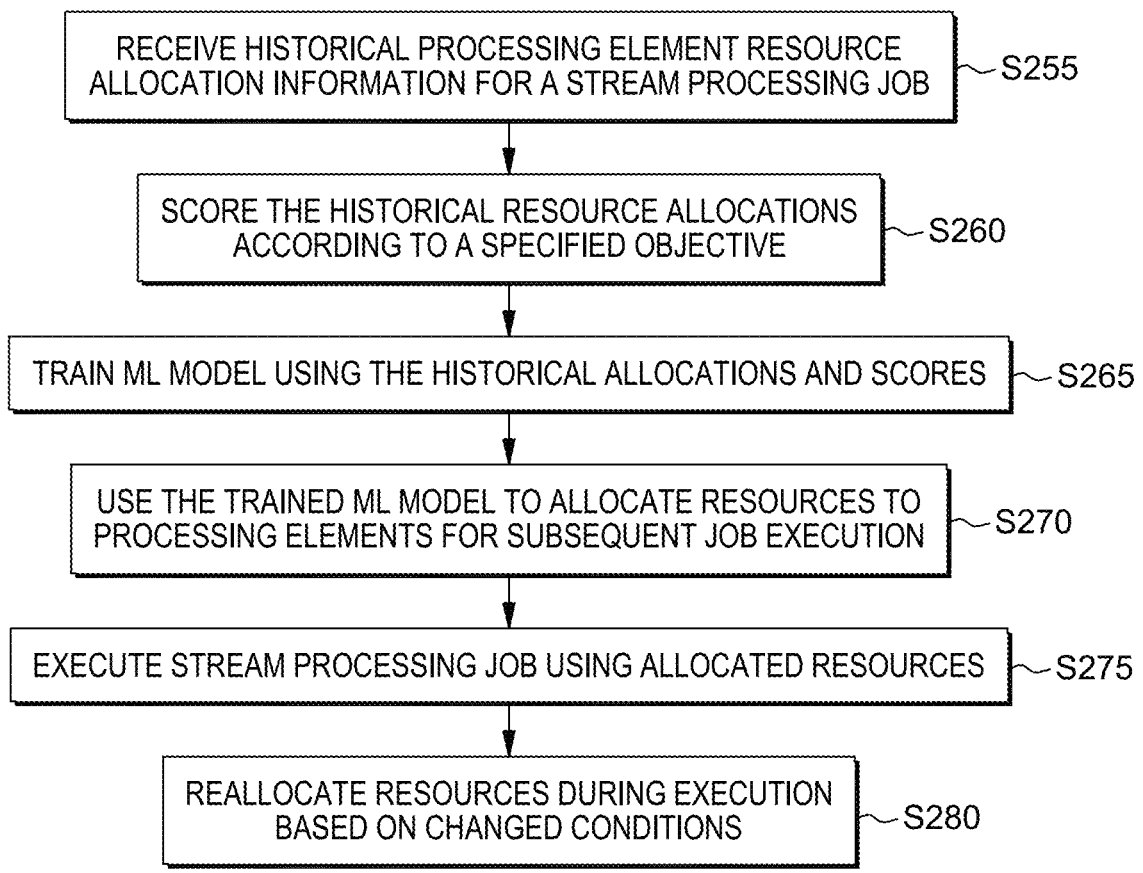
FIG. 4 is a flowchart showing a first embodiment method performed, at least in part, by the first embodiment system.
Figure 5:
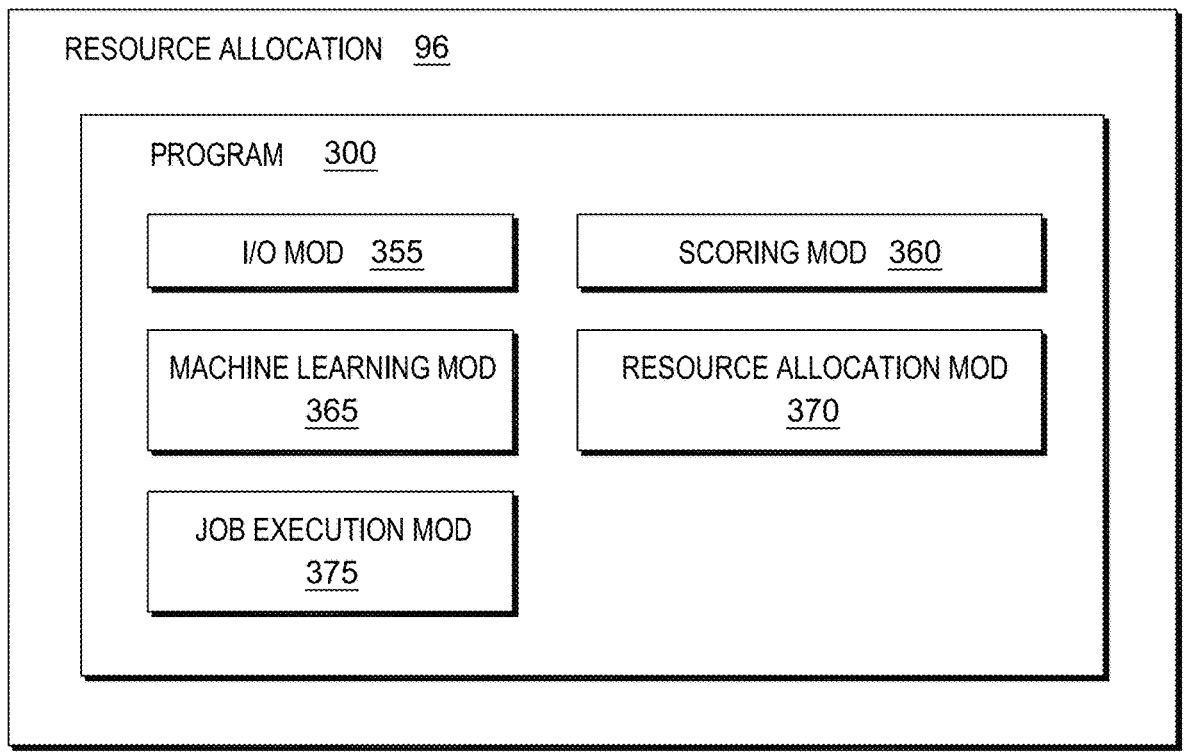
FIG. 5 is a block diagram showing a machine logic (for example, software) portion of the first embodiment system.

FIG. 4 shows flowchart 250 depicting a computer-implemented method according to the present invention. FIG. 5 shows program 300 of resource allocation 96 (see FIG. 3), for performing at least some of the method operations of flowchart 250. This method and associated software will now be discussed, over the course of the following paragraphs, with extensive reference to FIG. 4 (for the method operation blocks) and FIG. 5 (for the software blocks).

Generally speaking, in this example embodiment (also referred to in this sub-section as the "present embodiment," the "present example," the "present example embodiment," and the like), program 300—and, more broadly, resource allocation 96—allocates resources to processing elements of a stream processing job. It should be noted that this example embodiment is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

While the discussion of the present example embodiment generally focuses on the processing elements as being the execution units of the stream processing job, it should be noted that the processing elements of the present embodiment may be replaced by any other capable stream processing execution units known or yet to be known in the art. For example, while stream processing operators that manipulate input streams of tuple data and produce corresponding output streams are typically contained within processing elements, the term "operator" can generally be substituted for the broader term "processing element" in many cases, as allocating computing resources to a processing element will typically allocate computing resources to the respective operator(s) contained within that processing element.

The processing elements of the stream processing job may be individually or collectively located on respective computing units (such as nodes 10) of cloud computing environment 50, whether physical or virtual. For purposes of this disclosure, the "computing units" (or "units of computing") can be any computing construct capable of containing processing elements of stream processing jobs and having computing resources (such as CPU cores and memory) allocated to it for the processing of those stream processing jobs. In some embodiments, the computing units are virtual machines. In other embodiments, the computing units are cloud containers, such as Docker containers. In still other embodiments, the computing units are Kubernetes pods (which themselves may contain one or more cloud containers). In still other embodiments, the computing units include combinations of the above, or other known or yet to be known computing constructs meeting the above requirements. (Note: the term(s) "DOCKER" and/or "KUBERNETES" may be subject to trademark rights in various jurisdictions throughout the world and are used here only in reference to the products or services properly denominated by the marks to the extent that such trademark rights may exist.)

In this example embodiment, program 300 is a container orchestration program capable of allocating computing resources (such as CPU cores and memory) to the processing elements of the stream processing job by way of their respective computing units. While, for the purposes of this embodiment, program 300 performs all of the method operations of flowchart 250, in various other embodiments the different operations of flowchart 250 may be performed by one or more different components of cloud computing environment 50.

For additional examples of using a specific container orchestration program (Kubernetes) using specific units of computing (Kubernetes pods) to execute processing elements of stream processing jobs, see the Further Comments and/or Embodiments sub-section of this Detailed Description.

Processing begins at operation S255 (see FIG. 4), where I/O module ("mod") 355 (see FIG. 5) receives historical processing element resource allocation information for the stream processing job. In this operation, I/O mod 355 receives the historical processing element resource allocation information for purposes of scoring the results and using them to train a machine learning (ML) model, as will be discussed below.

It should be noted that the term "historical," as used in this context, is simply meant to indicate that the information relates to executions of the stream processing job that take place prior to the execution of the stream processing job at operation S275, discussed below. In many cases, as will be discussed in further detail in the Further Comments and/or Embodiments sub-section of this Detailed Description, the historical processing element resource allocation information is based on a series of test executions of the stream processing job, where the test executions are performed for the purpose of generating test data for training the ML model in subsequent operation S265.

Generally speaking, the historical processing element resource allocation information (also referred to simply as the "historical information") includes information pertaining to historical allocations of resources to processing elements of the stream processing job, how the processing elements performed under those allocations, and the outputs produced by the stream processing job using those allocations. For example, the historical information may include how many CPU cores were allocated to each processing element, how much random access memory (RAM) was allocated to each processing element, a frequency of input tuples (or input tuple type) for each processing element, how many processor cycles it took for each processing element to process a given number of tuples, a size or utilization percentage of a tuple queue for each processing element, and/or the output streams for each processing element over a given period of time. The historical information may also include workload characterization information, such as tuple size, tuple values, and/or type of workload. For example, in certain embodiments, such as embodiments relating to image processing, tuple size may have a higher impact on whether a resource allocation is determined to be optimal. In other (or the same) embodiments, tuple values may also play an important factor—for example, when the tuple flow is partitioned by tuple value. In these embodiments, if tuples in a first category are partitioned to a first set of processing elements (or a first part of an operator graph) and tuples in a second category are partitioned to a second set of processing elements (or a second part of an operator graph), tuple values can influence which processing elements have the most processing work to do.

Processing proceeds to operation S260 (see FIG. 4), where scoring mod 360 (see FIG. 5) scores the historical resource allocations according to a specified objective. Generally speaking, in this operation, scoring mod 360 analyzes the historical information and scores each historical allocation based on how well the respective allocation meets the specified objective.

The specified objective may be any one or more of a wide variety of possible objectives—whether technical or business in nature. For example, some possible technical objectives may include: (i) keeping CPU load to a minimum, or under a certain amount, (ii) keeping RAM utilization to a minimum, or under a certain amount, (iii) minimizing an amount of "wait time" for processing elements, and/or (iv) maximizing throughput (for example, tuple outflow rate). Some possible business objectives include: (i) cost in general, (ii) cost as applied to certain timeframes (e.g., during off-hours, at the end of a month/quarter), (iii) minimizing use during certain "peak" or otherwise undesired timeframes, and/or (iv) minimizing processing cost while still maintaining a defined Quality-of-Service (QoS) performance rating.

Processing proceeds to operation S265 (see FIG. 4), where ML mod 365 (see FIG. 5) trains an ML model using the historical information and the corresponding scores generated by scoring mod 360. For example, in some cases, ML mod 365 may train the ML model, via backpropagation, by using the historical information as training input and the corresponding scores as training output. In other cases, ML mod 365 may select the historical information that results in the best score for a given set of circumstances, and use just the selected historical information to train the ML model. For example, the historical information may include sets of CPU core adjustments for each processing element, and ML mod 365 may select the CPU core adjustments that result in the best score for each of a given set of circumstances, such as given sets of tuple queue utilization rates. For further discussion of such embodiments, see the Further Comments and/or Embodiments sub-section of this Detailed Description.

It should be noted that in many embodiments, including the present example embodiment, ML mod 365 uses supervised methods for training the ML model—generally either using the scores themselves as labels or using the scores to select training data sets from the larger set of historical information. However, in other embodiments, this is not necessarily the case. In other embodiments, many other known or yet to be known ML training methods may be used, such as unsupervised methods, semi-supervised methods, reinforcement methods, self-learning methods, feature learning methods, and the like, either on their own or in combination with other methods.

It should also be noted that although the present example embodiment trains the ML model using the historical information and corresponding scores, in other embodiments, other information capable of training a ML model to recommend resource allocations according to one or more objectives may be used.

Processing proceeds to operation S270 (see FIG. 4), where resource allocation mod 370 (see FIG. 5) uses the trained ML model to allocate resources to processing elements for a subsequent execution of the stream processing job. Generally speaking, in this operation, resource allocation mod 370 provides inputs to the ML model based on the specific training of the ML model, where the inputs are generally based on a current status of the stream processing job. For example, in some cases, resource allocation mod 370 retrieves setup parameters of the stream processing job, provides the setup parameters to the trained ML model, and then receives as output from the trained ML model a recommended allocation of resources for the processing elements of the stream processing job. In other cases, other inputs are used, such as tuple queue utilizations, tuple flow rates, tuple types, or the like.

In some cases, the allocating of the resources to the processing elements includes multiple phases: (i) a first phase that allocates a first subset of resources based on respective minimum resource requirements of the processing elements, and (ii) a second phase that allocates a second subset of resources based on the allocation determined using the trained machine learning model. In this way, embodiments of the present invention can provide an optimized allocation of resources that also meets the respective minimum resource requirements (or any other desired requirements) for each of the processing elements. Other combinations of phases and subsets may also be used, depending on the particular needs and requirements of the given stream processing job.

Further, in some cases, the number of resources that can be allocated are capped or otherwise limited based on resource budgets, either on a processing element level, a stream processing job level, or at a system level. In these cases, for example, the second subset of resources allocated in the second phase could be the number of resources remaining in a resource budget after allocating the first subset of resources.

Processing proceeds to operation S275 (see FIG. 4), where job execution mod 375 (see FIG. 5) executes the stream processing job using the allocated resources. In some cases, when the stream processing job is already executing, "executing" in this context simply means executing the stream processing job under the new resource allocations determined in operation S270. In other cases, for example, where the allocations of operation S270 take place at a setup phase, operation S275 is where actual execution of the stream processing job begins.

Processing proceeds to operation S280 (see FIG. 4), where resource allocation mod 370 (see FIG. 5) reallocates resources during execution of the stream processing job according to changed conditions of the stream processing job (i.e., conditions that have changed since a beginning of the executing of the stream processing job). In this operation, program 300 iteratively repeats the allocating of operation S270 (i.e., performs a "re-allocating") using an updated status of the stream processing job, where the updated status is based, at least in part, on the changed conditions. For example, if tuple queue utilization of the processing elements was used in operation S270 to determine the initial resource allocation for the processing elements of the stream processing job, and the tuple queue utilization of the processing elements changed over a period of time, operation S280 provides the new tuple queue utilizations as input to the ML model, and the resulting resource allocations (or resource allocation adjustments) received as output from the ML model are applied to the currently executing stream processing job to ensure optimal performance throughout its processing. In some cases, the reallocation is triggered by detecting or identifying the changed condition, and in other cases, the reallocation is triggered automatically after a certain amount of time, or by a user request. For further discussion of the reallocation of resources throughout the processing/executing of a stream processing job, see the Further Comments and Embodiments sub-section of this Detailed Description, below.

Further Comments and/or Embodiments

Some embodiments of the present invention may include one, or more, of the following features, characteristics and/or advantages: (i) dynamically adjusting amounts of compute resources for stream processing operators based on several performance factors; (ii) spreading and dynamically adjusting CPU resources allocated at a stream processing job level across cloud containers; (iii) using machine learning to optimally budget compute resources (e.g., CPU, memory) for each container in a containerized environment; (iv) using machine learning models to determine resource adjustments to containers based on current workflow; (v) as circumstances change, adjusting resource spread using machine learning models, and further allowing for budgeted resource amounts to be changed based on business considerations; (vi) adjusting/scaling resources themselves to allow processes to utilize additional power or space, or to reduce the size of the resources being utilized; (vii) given a CPU budget for a stream processing job, dynamically adjusting the CPUs of containers of the job to improve overall tuple rates; and/or (viii) providing a machine learning based solution that is outside of the existing flow of a stream processing job.

Some embodiments of the present invention provide for budget driven, automatic optimizing of resource management for stream processing systems running in containerized environments, such as Kubernetes environments. In many of these embodiments, processing elements of stream processing jobs, each containing collections of one or more operators, are contained within Kubernetes pods. For the purposes of the following discussion, the term "pod" generally refers to Kubernetes pods that contain processing elements in this manner, although other configurations of known or yet to be known "pods" may also be used.

Some embodiments of the present invention recognize that, in many conventional cloud environments, user jobs are charged based on the amount of CPU requested. As such, it can be important to constrain a job's CPU usage to a budget, and equally important to spread the CPU budget optimally to stream processing pods to provide optimal results.

Some embodiments of the present invention recognize that, generally speaking, streaming processing jobs are made of graphs of very interdependent pods. How well one pod processes its tuples can greatly affect how well other pods are able to process their tuples. The number of CPU cores that are allocated to a pod has a tremendous influence on how well it is able to process tuples.

Some embodiments of the present invention recognize that container orchestration systems, such as Kubernetes, manage system resources across applications deployed in a containerized environment. These container orchestration systems do this by serving as resource brokers between individual jobs and a deployment sub-system. A container orchestration system can see the requirements for a number of pods along with resource requirements for the pods. A resource requirement can, for example, be made up of a "request" value and a "limit" value, where the request value defines how many CPU cores the system guarantees to be made available to that pod, while the limit value is the maximum number of CPU cores the system will allow the pod to have access to.

Some embodiments of the present invention recognize that, if the sum of the request values across the pods of a system are less than the amount that the deployment sub-system has available, then there are surplus CPUs. These surplus CPUs can be spread across the pods according to internal scheduling rules, for example.

Some embodiments of the present invention recognize that, while some container orchestration systems may do well at managing resources across enterprise-wide requirements, such systems may be limited on how well they can locally optimize resources to individual jobs. For example, a container orchestration system may be aware that a given job should be allocated 10 CPU cores, but may have no knowledge on how to best allocate the 10 CPU cores among the pods within the job to provide the optimal business value.

Some embodiments of the present invention recognize that, in state-of-the-art stream processing systems deployed in containerized environments, the stream processing systems may statically determine how many determine how many CPU cores to allocate to each pod (for example, if 4 pods and 10 CPU cores, the system would allocate 2.5 CPU cores to each pod, with a limit of 4 cores per pod). These pod requirements would be defined at submit time and remain so for the life of the job.

Some embodiments of the present invention recognize that a problem with this solution for deployment is that it typically results in a non-optimal deployment. The pods in a stream processing job are unique in the processing they do, and how they connect to other pods within the job. As workloads are processed, the processing needs for various pods may vary significantly, and because resource requirements do not react to these changing needs, the result can be inefficient CPU usage and non-optimal processing results.

Some embodiments of the present invention recognize that some container orchestration systems, such as Kubernetes, may allow CPU cores to be changed for a pod; however, such changes can be very disruptive to tuple processing as they can cause the pod to be stopped and restarted. In these situations, processing element state could be lost, and incoming tuples could be missed.

Some embodiments of the present invention recognize that, with respect to the current state of the art, no existing systems utilize machine learning to optimally allocate CPU resources to pods that host or otherwise contain processing elements in a stream processing system.

Some embodiments of the present invention provide a resource management mechanism that leverages machine learning techniques to optimally deploy and dynamically manage a stream processing job within a containerized environment, such as within a Kubernetes cluster. In these embodiments, the resource management mechanism obeys a CPU core budget for the job while dynamically managing the CPU cores allocated to each individual pod according to the individual needs of each pod during the lifetime of the job. This results in efficient use of the CPU cores and delivers optimal job results.

Individual pods in a stream processing job can have high numbers of inter-dependencies. This can be due to the nature of how streams of tuples flow through and get processed by the pods. The dynamic complexity of the interaction and inter-dependencies that exist between the application pods of a stream processing job as tuple workloads are processed makes it difficult to achieve optimal results using more traditional methods.

Some embodiments of the present invention leverage machine learning to optimize job results by managing how CPU usage is dynamically spread across pods to serve each pod's unique processing demands. These embodiments continually monitor various execution metrics, and then leverage machine learning models to determine what adjustments to individual pod request values will achieve the best results for the current situation.

Some embodiments of the present invention also provide a means of changing a budgeted amount of CPU cores for a job depending upon outside business considerations. For example, it may be desirable to lower the CPU budget for off-shift hours, or at the end of a month. In these embodiments, the same machine learning models may be able to be used regardless of the current budget amount.

Some embodiments of the present invention may include one, or more, of the following features, characteristics and/or advantages: (i) maintaining a CPU core budget at the job level, which can be changed as business or technical goals change; (ii) using machine learning techniques to optimize how the CPU core budget is allocated to individual pods of the job to achieve optimal results; (iii) determining what is considered optimal for the job by scoring desired outcomes higher and using the scores to train a machine learning model what is important from a business or other perspective; (iv) dynamically monitoring specific circumstances (tuple flow rate, tuple types, etc.) to ensure that optimal pod core allocations are made even as circumstances change; and/or (v) referencing tuple queue utilization metrics of processing elements in the pods to quantify circumstances for use by the machine learning model.

Figure 6:
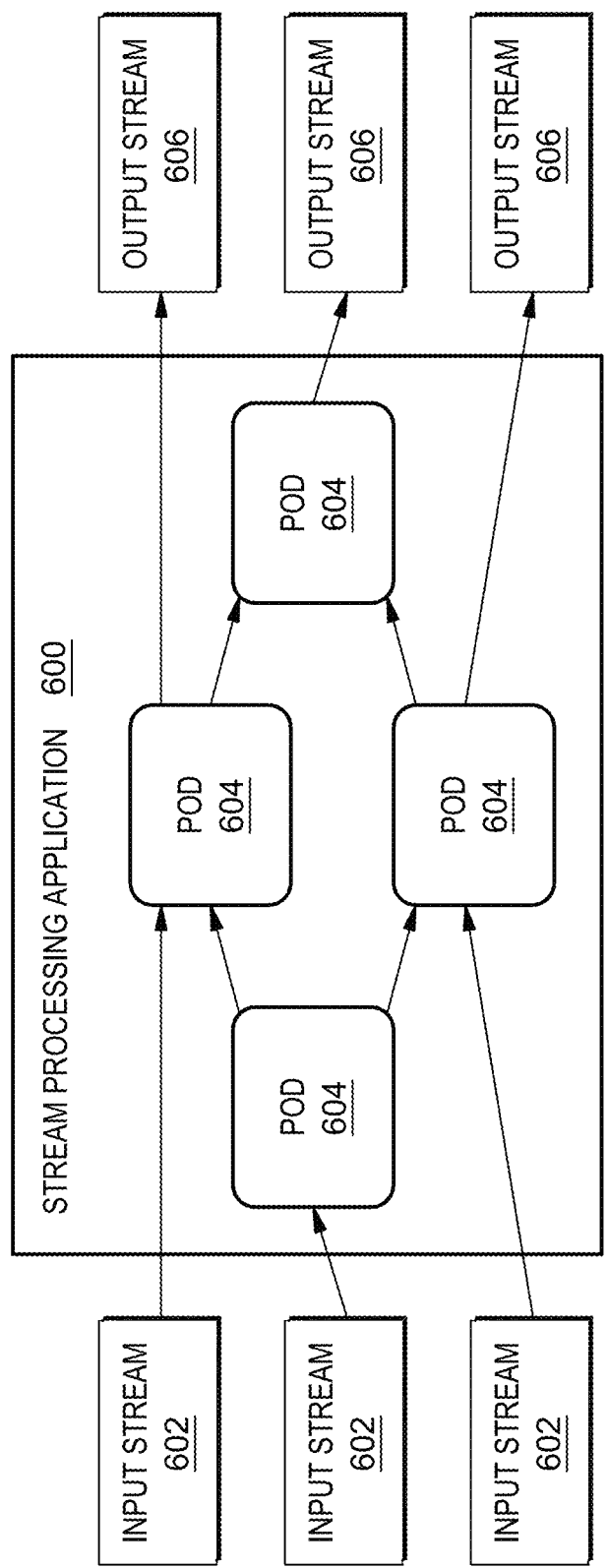
FIG. 6 is a block diagram depicting a stream processing application according to an embodiment of the present invention.

FIG. 6 is a block diagram depicting stream processing application 600, according to an embodiment of the present invention. The embodiment depicted in FIG. 6 will now be discussed, over the course of the following paragraphs, with respect to FIG. 6 as well as subsequent FIGS. 7-10. Generally speaking, the discussion of FIGS. 6-10 will cover: (i) details on how tuple processing is performed within each pod; (ii) the architecture for training ML models that are used to optimize pod resource allocation; and (iii) the architecture for running a stream processing job leveraging the trained ML models for optimal performance.

In this and other embodiments, stream processing jobs are made up of a highly interdependent graph of pods 604 that process tuples as the tuples make their way through the graph. In these embodiments, each individual pod 604 has a unique set of responsibilities, which are generally performed by respective operator processing graphs internal to each pod 604. Each individual pod 604 requires a unique amount of resources to process respective input streams 602 and output streams 606.

In the block diagram of FIG. 6, stream processing application 600 is depicted as having three input streams 602, four Pods 604, and three output streams 606. However, it should be noted that stream processing application 600 is presented for relative simplicity, and that, in many cases, stream processing applications of the present invention will have varying numbers of pods, varying configurations and operator processing graphs, and varying numbers and types of input streams and output streams.

Figure 7:
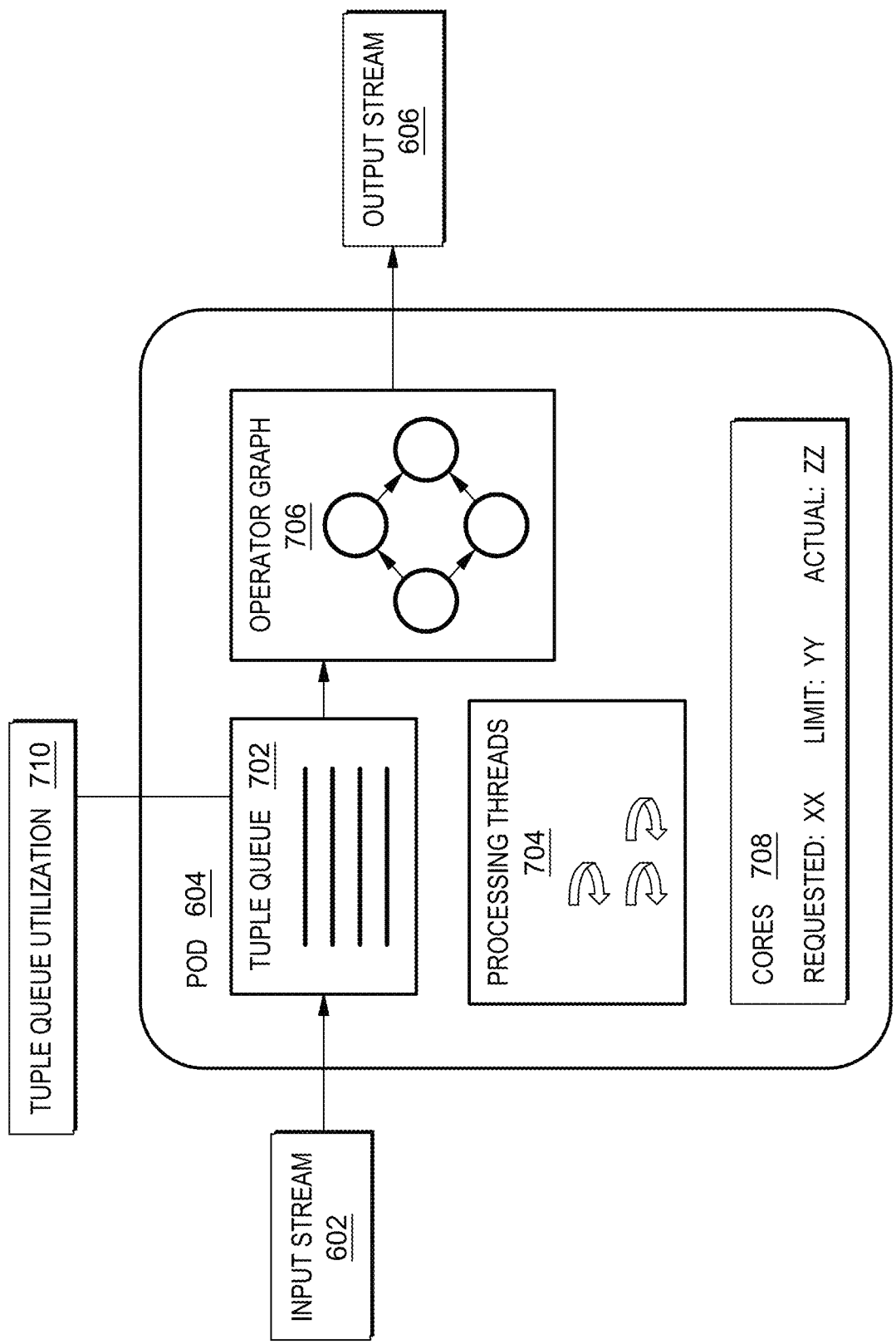
FIG. 7 is a block diagram depicting tuple processing at a stream processing pod, according to an embodiment of the present invention.

FIG. 7 is a block diagram depicting tuple processing at pod 604, within stream processing application 600 of FIG. 6, according to an embodiment of the present invention. In this embodiment, tuples flow into pod 604 via input stream 602 and are placed in tuple queue 702. Tuple processing threads 704 read the tuples from tuple queue 702 and process the tuples through operator graph 706 to produce output tuples of output stream 606. In this embodiment, the number of tuple processing threads is determined by the complexity of the operator graph and the number of CPU cores 708 available to pod 604. Generally speaking, increasing the number of CPU cores 708 will increase the number of processing threads 704 in pod 604.

In this embodiment, the number of CPU cores 708 allocated to pod 604 is based on a pod subscription having three values: (i) a "Requested" value indicating a guaranteed number of fractional cores; (ii) a "Limit" value indicating a maximum number of fractional cores; and (iii) an "Actual" value indicating the actual number of fractional cores being used by pod 604 at a given time.

Tuple queue utilization 710, which can generally be represented as the number of tuples in tuple queue 702 divided by the size of tuple queue 702, is an indicator of how effectively the tuples are being processed. For example, a tuple queue utilization 710 of zero would mean that the tuples are being processed very effectively, while a tuple queue utilization 710 of one would indicate that more cores 708 may be needed.

Figure 8:
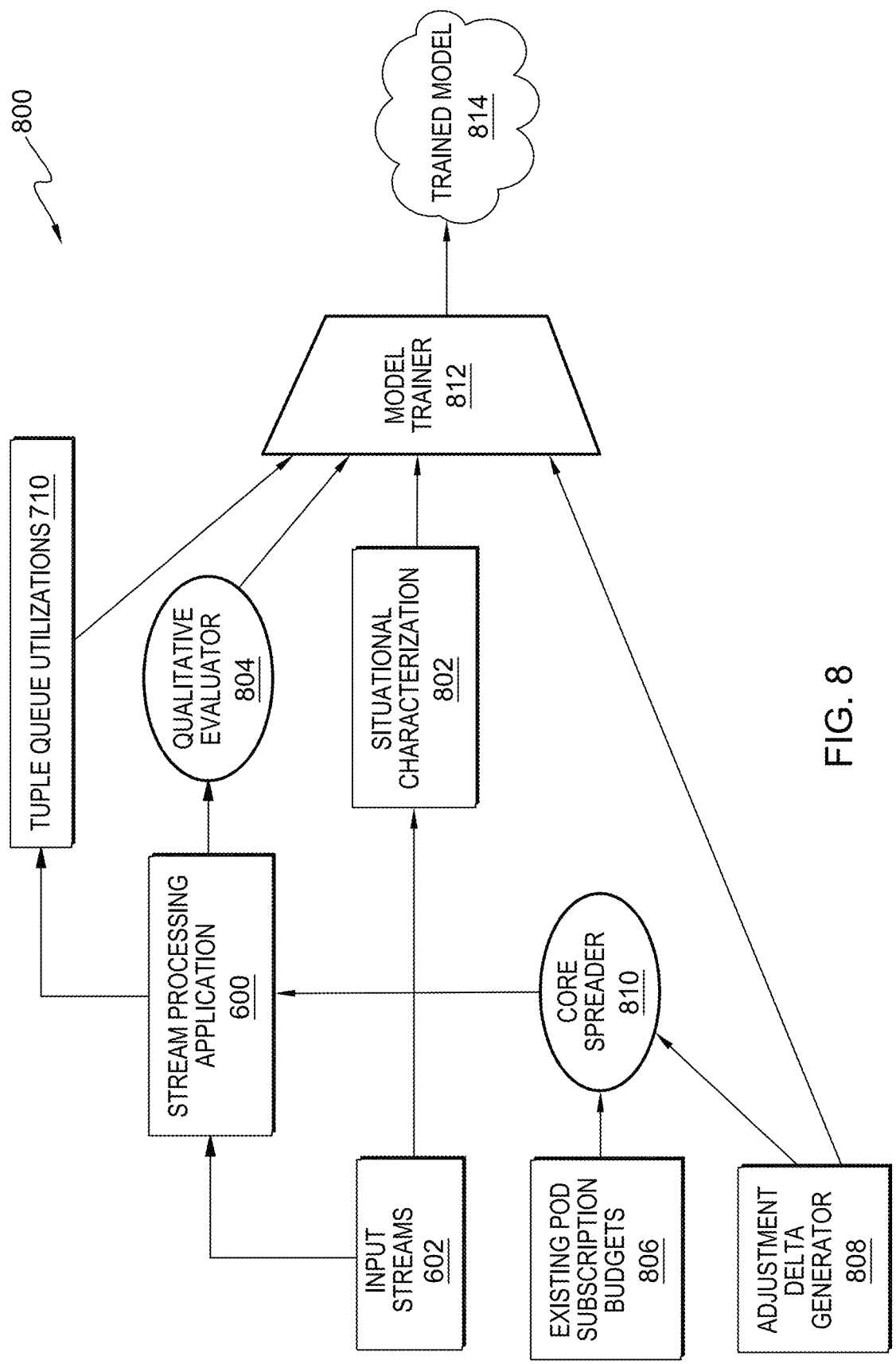
FIG. 8 is a block diagram depicting a machine learning model training system according to an embodiment of the present invention.

FIG. 8 is a block diagram depicting machine learning model training system 800, including stream processing application 600 of FIG. 6, according to an embodiment of the present invention. In this embodiment, an ML model is trained to determine optimal adjustment deltas for pod subscriptions based on a set of tuple queue utilizations for stream processing application 600, and on a situational characterization of input stream 602.

As depicted in FIG. 8, in this embodiment, input streams 602 provide tuples to both stream processing application 600 and situational characterization 802. Stream processing application 600 provides the output tuples of output streams 606 to qualitative evaluator 804, which evaluates the quality of the processing of stream processing application 600. In this embodiment, qualitative evaluator 804 evaluates the quality of the processing of stream processing application 600 using an evaluation score. For example, the evaluation score may be based, at least in part, on: (i) how fast tuples are processed (output tuple rate vs. input tuple rate); (ii) CPU usage efficiency (CPU request values vs. actual usage), (iii) how balanced the tuple queue utilization (TQU) rates of the processing elements are; and/or (iv) total CPU usage cost.

Situational characterization 802 takes the received input streams 602 and abstracts the most relevant aspects of those input streams 602 to characterize the workload based on tuple characteristics. For example, in some embodiments, situational characterization 802 abstracts the tuple frequency and tuple type frequency of input streams 602 where, for example, 100 tuples per second of 10,000 byte tuples may be characterized differently than 10,000 tuples per second of 100 byte tuples. In various other (or the same) embodiments, tuple category fields can be relevant in characterizing the workload—for example, where some tuples are categorized as "high resolution" and other tuples are categorized as "low resolution," such categorizations may be a significant factor in how the tuples are processed in the graph.

Adjustment delta generator 808, also depicted in FIG. 8, is configured to generate trial/training CPU core adjustments for stream processing application 600. In some cases, adjustment delta generator 808 uses a random number generator or other virtually randomized method to generate the adjustments. In other cases, a greedy algorithm is used. In still other cases, other known or yet to be known methods for generating training data may be used, on their own or in combination with either of the aforementioned methods.

The trial/training CPU core adjustments are provided to core spreader 810, which applies the trial CPU core adjustments to existing pod subscription budgets 806, and applies the resulting CPU core budgets to the pods of stream processing application 600.

Finally, the tuple queue utilizations 710, situational characterization 802, and trial CPU core adjustments from adjustment delta generator 808 are all fed into ML model trainer 812, along with the results from qualitative evaluator 804. In this embodiment, the results from qualitative evaluator 804 serve as the training label for trial CPU core adjustments, indicating whether particular trial CPU core adjustments produced optimal results. The training results in trained ML model 814. In this embodiment, ML model 814 is configured to receive, as input, for a given stream processing application, (i) a situational characterization of an input stream into the stream processing application, and (ii) tuple queue utilizations related to the processing of the input stream by the stream processing application. Then, as a result of those inputs, trained ML model 814 generates, as output, a set of optimal adjustment deltas for pod subscriptions of the stream processing application.

Figure 9:
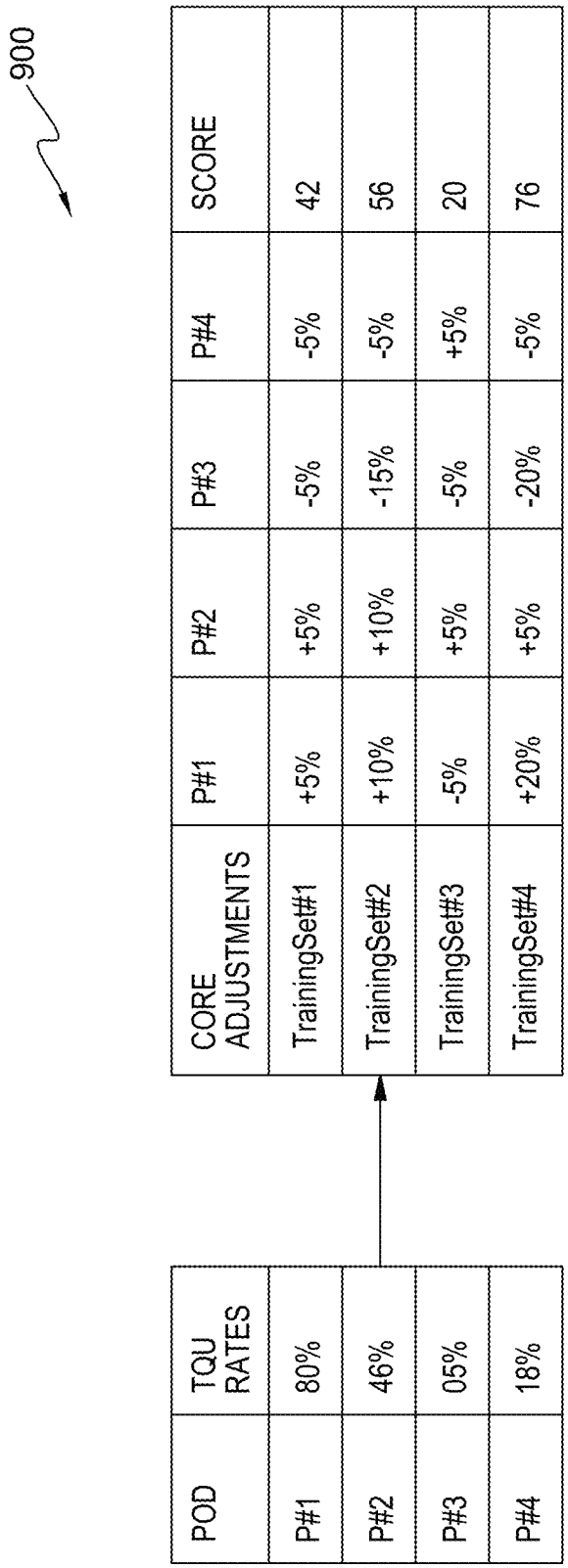
FIG. 9 is a table diagram depicting example training data according to an embodiment of the present invention.

FIG. 9 is a table diagram depicting example training data table 900 according to an embodiment of the present invention. In this embodiment, model trainer 812 (see FIG. 8) determines the best adjustments to make to the core values of individual pods 604 of stream processing application 600 (see FIGS. 6 and 7) based on the respective current TQU rates of pods 604.

As depicted in table 900, respective TQU rates are collected for pods 604 (P#1, P#2, P#3, and P#4) of stream processing application 600. Then, in this example, adjustment delta generator 808 (see FIG. 8) generates four training sets of CPU core adjustments (TrainingSet#1, TrainingSet#2, TrainingSet#3, and TrainingSet#4) and separately applies the sets of CPU core adjustments to pods 604 (P#1, P#2, P#3, and P#4). The output streams 606 produced by stream processing application 600 (see FIG. 6) for each set of CPU core adjustments are then scored by qualitative evaluator 804 (see FIG. 8), and the resulting scores are used to determine which set of CPU core adjustments to use. In this example, because TrainingSet#4, with core adjustments of +20, +5, −20, −5 for Pods P#1, P#2, P#3, and P#4, respectively, produces the highest score (76), TrainingSet#4 is determined to be the best, or optimal, set of CPU core adjustments for the depicted TQU rates for Pods 604. Model trainer 812 trains ML model 814 accordingly. As such, in the future, when the TQU rates for Pods P#1, P#2, P#3, and P#4 are close to 80%, 46%, 05%, and 18%, respectively, ML model 814 will recommend core adjustments of 20, +5, −20, −5 for Pods P#1, P#2, P#3, and P#4, respectively, particularly when the future workload is characterized similarly to the workload used for the training (for example, both workloads are "high volume" or both workloads are "low volume").

Figure 10:
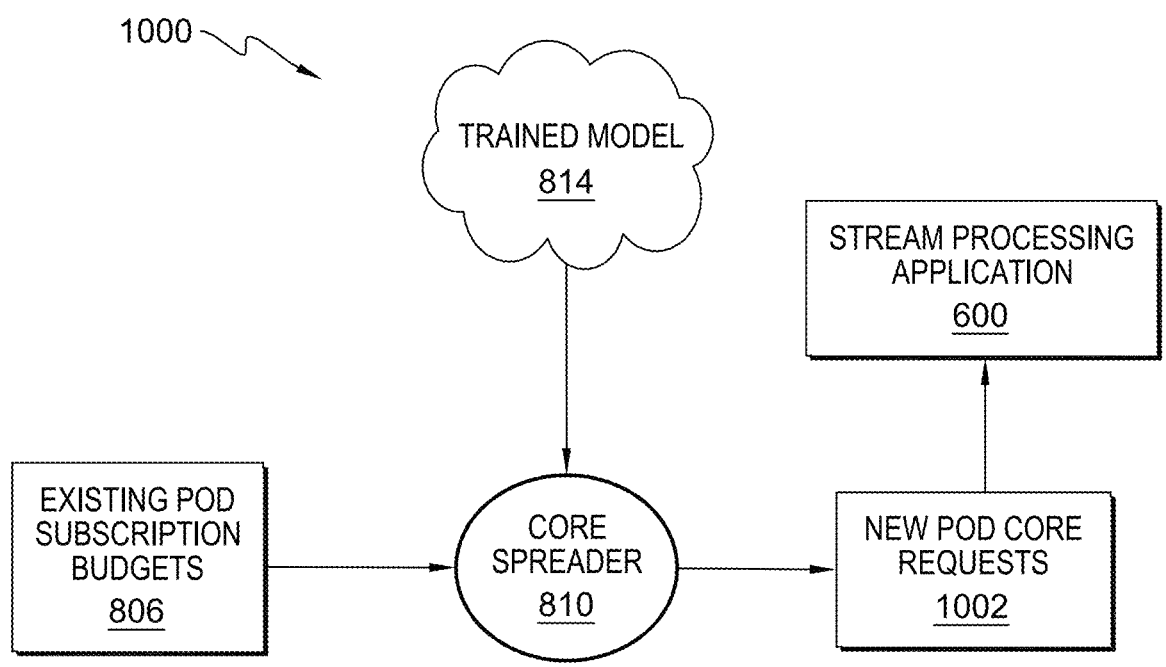
FIG. 10 is a block diagram depicting a machine learning model-based resource allocation system, for a stream processing application operating in a containerized computing environment, according to an embodiment of the present invention.

FIG. 10 is a block diagram depicting machine learning model based core allocation system 1000, including stream processing application 600 of FIG. 6 and components of machine learning model training system 800 of FIG. 8, according to an embodiment of the present invention. In this embodiment, trained ML model 814 is utilized to update the CPU core allocation of Pods 604, resulting in a more optimal CPU core distribution.

As depicted in FIG. 10, the existing pod subscription budgets 806 and the output of ML model 814 are utilized by core spreader 810 to generate new pod core requests 1002, which are then applied to pods 604 of stream processing application 600. More specifically, at runtime, ML model 814 determines the optimal CPU core adjustments for pods 604 based on the respective TQU rates for each of pods 604. The determined CPU core adjustments are then applied to the existing pod subscription budgets 806, resulting in new pod core requests 1002 for stream processing application 600.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   training, by one or more processors, a machine learning model to determine allocations of computing resources to processing elements of a stream processing job according to a specified objective; and
   allocating, by one or more processors, a set of computing resources to the processing elements by:
      allocating to the processing elements a first subset of the set of computing resources based, at least in part, on a minimum resource requirement for the processing elements, and
      allocating to the processing elements a second subset of the set of computing resources based, at least in part, on an allocation determined using the trained machine learning model;
      wherein the allocating of the second subset is based on scoring of historical resource allocation information associated with the trained machine learning model and selecting CPU core adjustments of processing elements that result in a best score of the scoring.

2. The computer-implemented method of claim 1, further comprising:
   executing, by one or more processors, the stream processing job according to the allocated set of computing resources.

3. The computer-implemented method of claim 2, wherein the training of the machine learning model includes training the machine learning model to determine the allocations of the computing resources to the processing elements further according to respective tuple queue utilizations of the processing elements.

4. The computer-implemented method of claim 3, further comprising:
identifying, by one or more processors, that the tuple queue utilizations of the processing elements have changed since a beginning of the executing of the stream processing job; and
re-allocating to the processing elements the second subset of the set of computing resources based, at least in part, on the changed tuple queue utilizations and a second allocation determined using the trained machine learning model.

5. The computer-implemented method of claim 1, wherein the specified objective includes minimizing a cost of the allocated set of computing resources.

6. The computer-implemented method of claim 1, wherein the set of computing resources is allocated to the processing elements by a container orchestration system.

7. The computer-implemented method of claim 6, wherein the processing elements each correspond to respective units of computing deployed by the container orchestration system.

8. The computer-implemented method of claim 7, wherein the container orchestration system is Kubernetes, and wherein the units of computing are Kubernetes pods.

9. A computer program product comprising one or more computer readable storage media, and program instructions collectively stored on the one or more computer readable storage media, the stored program instructions comprising:
program instructions to train a machine learning model to determine allocations of computing resources to processing elements of a stream processing job according to a specified objective; and
program instructions to allocate a set of computing resources to the processing elements by:
allocating to the processing elements a first subset of the set of computing resources based, at least in part, on a minimum resource requirement for the processing elements, and
allocating to the processing elements a second subset of the set of computing resources based, at least in part, on an allocation determined using the trained machine learning model;
wherein the allocating of the second subset is based on scoring of historical resource allocation information associated with the trained machine learning model and selecting CPU core adjustments of processing elements that result in a best score of the scoring.

10. The computer program product of claim 9, the stored program instructions further comprising:
program instructions to execute the stream processing job according to the allocated set of computing resources.

11. The computer program product of claim 10, wherein the training of the machine learning model includes training the machine learning model to determine the allocations of the computing resources to the processing elements further according to respective tuple queue utilizations of the processing elements.

12. The computer program product of claim 11, the stored program instructions further comprising:
program instructions to identify that the tuple queue utilizations of the processing elements have changed since a beginning of the executing of the stream processing job; and
program instructions to re-allocate to the processing elements the second subset of the set of computing resources based, at least in part, on the changed tuple queue utilizations and a second allocation determined using the trained machine learning model.

13. The computer program product of claim 9, wherein the specified objective includes minimizing a cost of the allocated set of computing resources.

14. The computer program product of claim 9, wherein:
the set of computing resources is allocated to the processing elements by a container orchestration system; and
the processing elements each correspond to respective units of computing deployed by the container orchestration system.

15. A computer system comprising:
a processor set; and
a computer readable storage medium;
wherein:
the processor set is structured, located, connected and/or programmed to run program instructions stored on the computer readable storage medium; and
the stored program instructions comprise:
program instructions to train a machine learning model to determine allocations of computing resources to processing elements of a stream processing job according to a specified objective, and
program instructions to allocate a set of computing resources to the processing elements by:
allocating to the processing elements a first subset of the set of computing resources based, at least in part, on a minimum resource requirement for the processing elements, and
allocating to the processing elements a second subset of the set of computing resources based, at least in part, on an allocation determined using the trained machine learning model;
wherein the allocating of the second subset is based on scoring of historical resource allocation information associated with the trained machine learning model and selecting CPU core adjustments of processing elements that result in a best score of the scoring.

16. The computer system of claim 15, the stored program instructions further comprising:
program instructions to execute the stream processing job according to the allocated set of computing resources.

17. The computer system of claim 16, wherein the training of the machine learning model includes training the machine learning model to determine the allocations of the computing resources to the processing elements further according to respective tuple queue utilizations of the processing elements.

18. The computer system of claim 17, the stored program instructions further comprising:
program instructions to identify that the tuple queue utilizations of the processing elements have changed since a beginning of the executing of the stream processing job; and
program instructions to re-allocate to the processing elements the second subset of the set of computing resources based, at least in part, on the changed tuple queue utilizations and a second allocation determined using the trained machine learning model.

19. The computer system of claim 15, wherein the specified objective includes minimizing a cost of the allocated set of computing resources.

20. The computer system of claim 15, wherein:
the set of computing resources is allocated to the processing elements by a container orchestration system; and the processing elements each correspond to respective units of computing deployed by the container orchestration system.

\* \* \* \* \*